US 7,765,594 B1

(12) United States Patent
Bennett et al.

(10) Patent No.: US 7,765,594 B1
(45) Date of Patent: Jul. 27, 2010

(54) DYNAMIC SECURITY DEPUTIZATION

(75) Inventors: Jeremy Bennett, Mountain View, CA (US); Robert Geiger, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 975 days.

(21) Appl. No.: 10/921,478

(22) Filed: Aug. 18, 2004

(51) Int. Cl.
*G06F 11/00* (2006.01)
*G06F 12/14* (2006.01)

(52) U.S. Cl. .............................. 726/22; 726/23; 726/24; 713/188

(58) Field of Classification Search ........................ None
See application file for complete search history.

(56) References Cited

U.S. PATENT DOCUMENTS

| | | | | |
|---|---|---|---|---|
| 5,491,791 | A  * | 2/1996 | Glowny et al. ................. | 714/37 |
| 2002/0087882 | A1* | 7/2002 | Schneier et al. ............. | 713/201 |
| 2003/0084322 | A1* | 5/2003 | Schertz et al. .............. | 713/200 |
| 2003/0097557 | A1* | 5/2003 | Tarquini et al. ............. | 713/153 |
| 2003/0131249 | A1* | 7/2003 | Hoffman .................... | 713/188 |
| 2003/0159060 | A1* | 8/2003 | Gales et al. ................. | 713/200 |
| 2003/0191966 | A1* | 10/2003 | Gleichauf ................... | 713/201 |
| 2004/0049698 | A1* | 3/2004 | Ott et al. ..................... | 713/201 |
| 2004/0093514 | A1* | 5/2004 | Piazza et al. ................ | 713/201 |
| 2004/0123141 | A1* | 6/2004 | Yadav ......................... | 713/201 |
| 2005/0050336 | A1* | 3/2005 | Liang et al. ................. | 713/188 |
| 2005/0050338 | A1* | 3/2005 | Liang et al. ................. | 713/188 |
| 2005/0060535 | A1* | 3/2005 | Bartas ........................ | 713/154 |
| 2006/0037075 | A1* | 2/2006 | Frattura et al. ............... | 726/22 |
| 2006/0069912 | A1* | 3/2006 | Zheng et al. ................ | 713/151 |
| 2007/0162973 | A1* | 7/2007 | Schneier et al. .............. | 726/22 |

OTHER PUBLICATIONS

Emilie Lundin and Erland Jonsson, "Survey of Intrusion Detection Research". Technical report Feb. 2004, Department of Computer Engineering, Chalmers University of Technology, Göteborg, Sweden, Jan. 2002.*

* cited by examiner

*Primary Examiner*—Emmanuel L Moise
*Assistant Examiner*—Luu Pham
(74) *Attorney, Agent, or Firm*—Hunton & Williams, LLP (57) ABSTRACT

Enhancing security capability of a network is described. In some embodiments, the method comprises detecting a security threat, sending a request to a networked device on the network to perform a deputized function that is not ordinarily performed by the networked device, receiving response data from the networked device and processing the response data. In some embodiments, the method comprises receiving a request from a security authority on the network to perform a deputized function that is not ordinarily performed, performing the deputized function as requested and sending response data to the security authority to be further processed.

8 Claims, 6 Drawing Sheets

DYNAMIC SECURITY DEPUTIZATION

FIELD OF THE INVENTION

The present invention relates generally to computer environments. More specifically, enhancing security capabilities of a network is disclosed.

BACKGROUND OF THE INVENTION

Computer security is an important issue in electronic communication systems. Since devices that operate on the endpoints of networks (e.g. client or server computers, networking devices, etc.) are often vulnerable to attacks, many existing security systems are configured to operate on endpoint devices. Security measures such as network data monitoring and virus scanning tend to be computationally intensive operations. Security functions and other duties of the system such as executing non-security related applications and performing networking functions typically compete for system resources, including processing cycles, memory and storage space. The devices often have to make trade-offs between system security and system performance.

Typically, large networks attempt to resolve this problem by deploying security measures within the network. Devices such as firewalls and Intrusion Detection/Prevention Systems can usually prevent malicious network traffic from reaching the endpoints. For security devices to properly function, it is usually required that all network traffic must pass through the links secured by the security device. While the requirement is often met in switched networks, it is sometimes unfulfilled in environments where shared medium such as a wireless network is used. Thus, network level security protections are often less effective for devices that are connected to a shared medium such as a broadcast wireless network.

Although IDS's, firewalls and other network monitors can detect attacks, they typically cannot intercept attacks before the attacks reach the endpoint devices. To increase the level of security protection and prevent attacks, the devices are typically required to devote more resources to perform security functions locally. Furthermore, an IDS deployed on a wireless network typically cannot monitor the entire network without deploying numerous sensors throughout the broadcast radius. The cost associated with the deployment and maintenance of the sensors is sometimes prohibitive for some wireless networks.

It would be desirable to have a technique that could prevent attacks on endpoint devices, especially devices connected to a shared medium. It would also be useful if the technique could monitor networking environments such as wireless networks without requiring extensive new deployment of sensors and without significantly sacrificing productivity and performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enhancing security capabilities of a network is disclosed. In some embodiments, a request is sent to one or more deputy devices when a security threat is detected. The deputy devices are asked to perform certain deputized functions that are not ordinarily performed, such as monitoring data not usually monitored by the devices, taking actions against a designated device, etc. In some embodiments, the deputy devices are selected from a set of candidate devices on the network.

Figure 1:
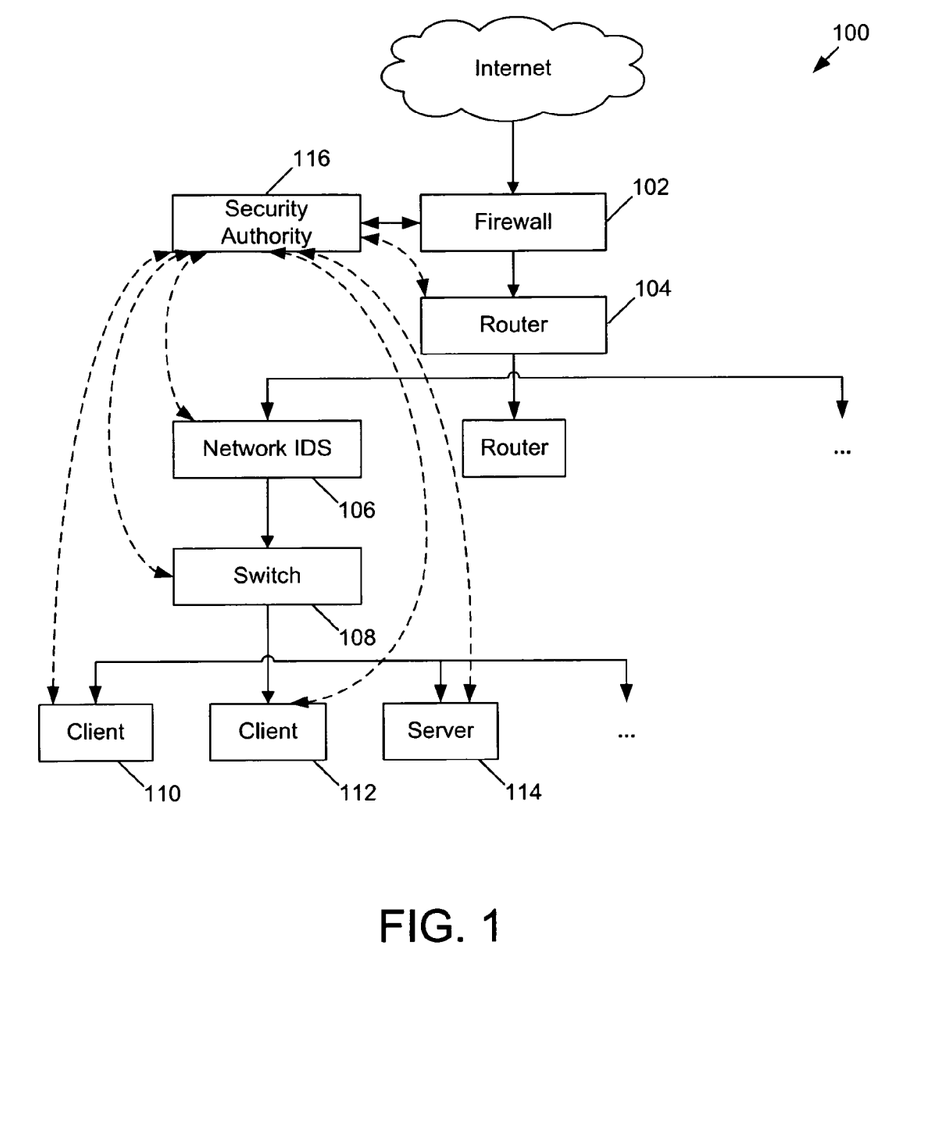
FIG. 1 is a system diagram illustrating a network according to some embodiments.

FIG. 1 is a system diagram illustrating a network according to some embodiments. In this example, data entering network 100 is filtered by firewall 102 and then sent to router 104. Router 104 forwards data to various subnets. In one subnet, data is processed by network IDS 106 before switched by switch 108 and then sent to endpoint devices such as client computers 110 and 112 and server computer 114. Security authority 116 monitors security events on the network. In various embodiments, the security authority may be a stand-alone entity or included in an IDS, a firewall or other appropriate security device. In some embodiments, agents that allow networked devices to cooperate with the security authority are installed on the networked devices.

Under normal operating conditions, the devices devote most of the available resources to perform their primary functions. If, however, the network enters a heightened state of security (for example, if it is determined that a device may have been compromised), security authority 116 can request other devices on the same network to perform certain tasks that are not normally performed by the devices. Assigning security related functions to other devices on the network when appropriate is referred to as "deputizing". More details of deputizing are discussed below.

Figure 2:
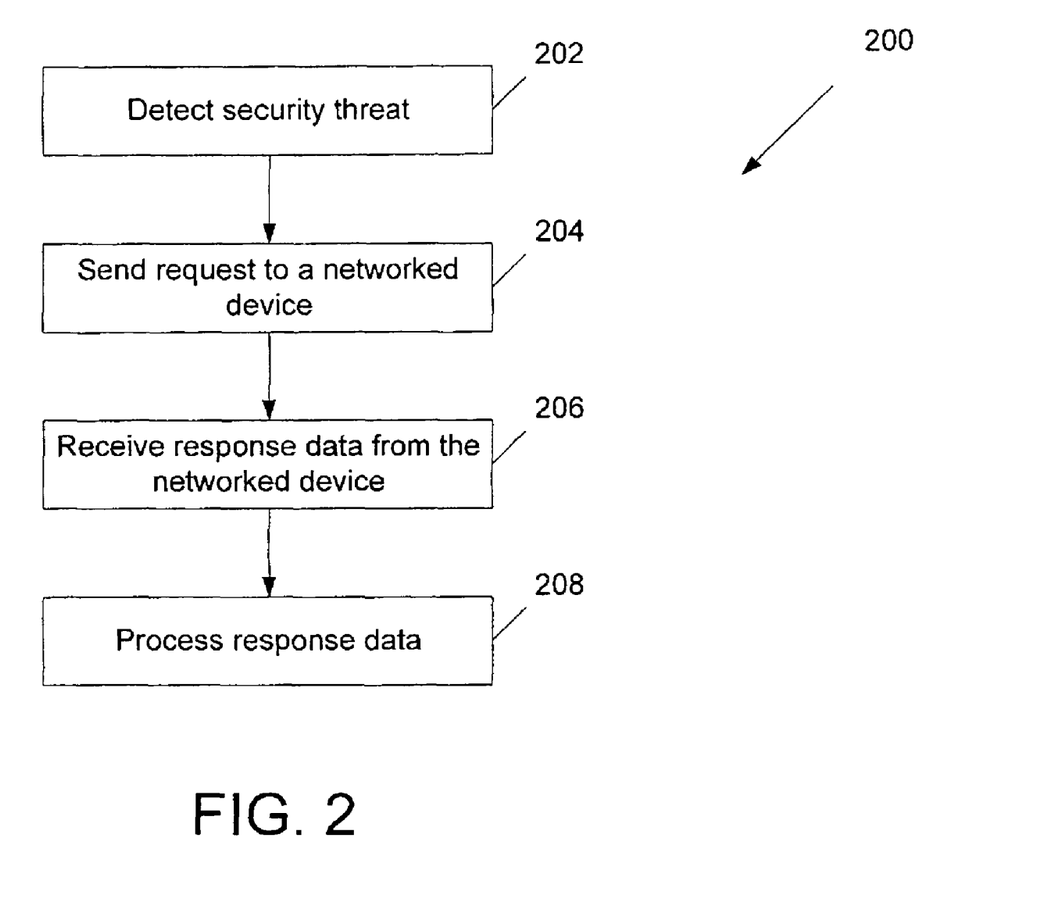
FIG. 2 is a flowchart illustrating a deputizing process of the security authority according to some embodiments.

FIG. 2 is a flowchart illustrating a deputizing process of the security authority according to some embodiments. In this example, process 200 begins when a security threat is detected (202). Security threats include viruses, worms, networks probes, as well as any other unusual activities or incidents that may compromise the security of any device on the network or the network as a whole. There are many ways to detect a security threat. For example, a firewall or IDS may detect suspicious activities and report the findings to the security authority. Local security measures such as virus scan software may also detect potential security breaches.

Upon detecting a security threat, a request is sent to one or more networked devices (204). The request asks the devices to perform functions that are not ordinarily performed. In some embodiments, the networked devices are requested to monitor data that is not ordinarily monitored by the networked devices during normal state of operation. For example, the network devices may be requested to monitor traffic patterns on the network, activities of its neighbors, data stored on hard drive or other local storage, or any other data that may be useful for security purposes. In some embodiments, the networked devices are requested to perform security tasks such as scanning for viruses, generating log information, disabling certain services, etc. In this example, data sent by the networked devices in response to the request, such as monitored data and status information is then received (206) and further processed by the security authority (208).

Figure 3:
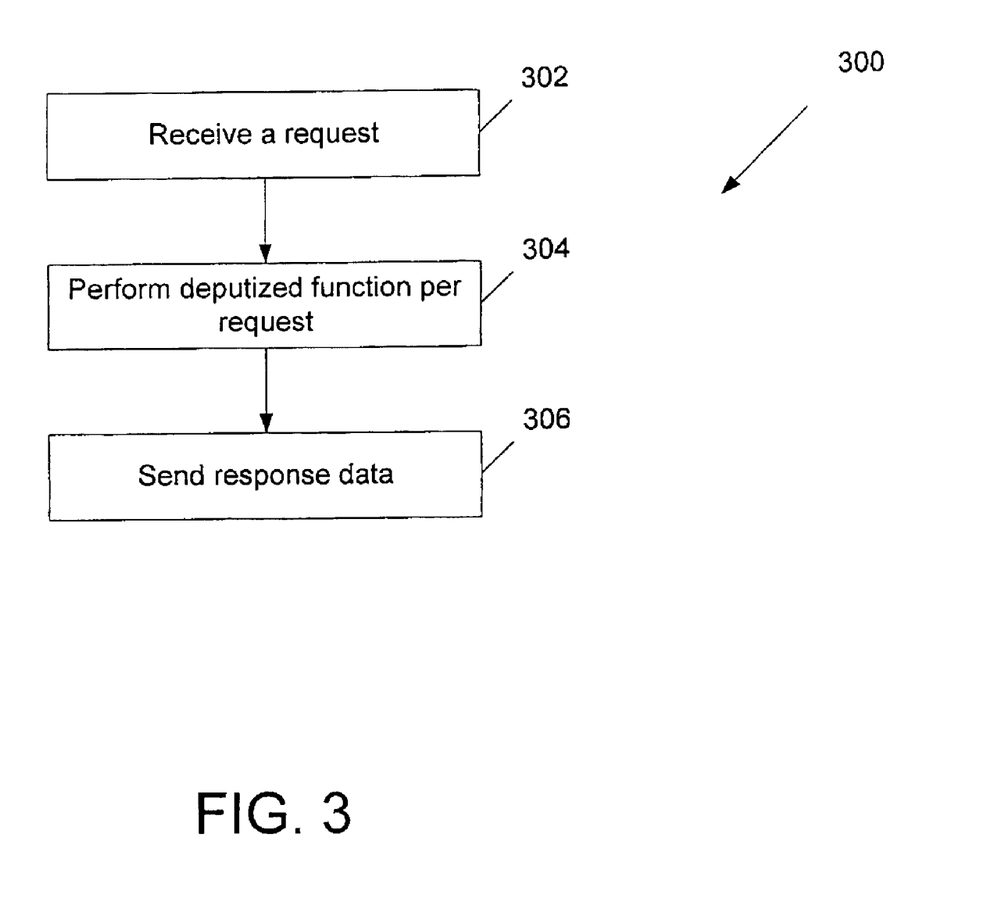
FIG. 3 is a flowchart illustrating the operations of a networked device according to some embodiments.

FIG. 3 is a flowchart illustrating the operations of a networked device according to some embodiments. In some embodiments, the operations are performed by an agent residing on the networked device that enables the device to cooperate with the security authority. An agent may be implemented as software or firmware, embedded in a processor, integrated circuit as well as any other appropriate components or combinations thereof. In this example, process 300 starts when a request is received (302). The agent and/or other appropriate components of the device then perform the requested deputized functions, such as monitoring data on the network (304). Data obtained by the device in response to the request is then sent to the security authority to be further processed (306).

Figure 4:
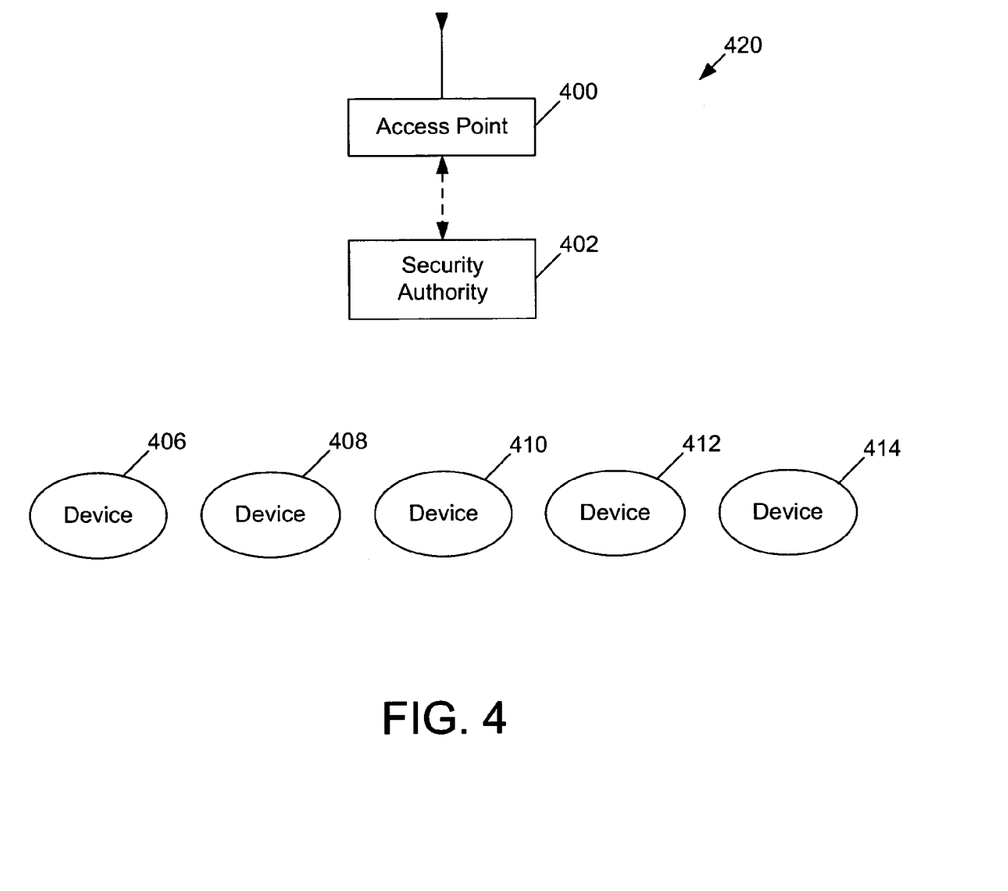
FIG. 4 is a system diagram illustrating a wireless network according to some embodiments.

The techniques described above are also applicable to networks that include wireless devices. FIG. 4 is a system diagram illustrating a wireless network according to some embodiments. Network 420 shown in this example may be a wireless local area network (e.g. a network that complies with IEEE 802.11a or IEEE 802.11g standard), a cellular telephony network or any other appropriate wireless network. In this example, wireless devices such as device 406-414 establish their communication channels via an access point 400. Each device may join or leave the network at any time. Security authority 402 communicates with access point 400 to send data to and receive data from devices on the network. In some embodiments, the security authority is a component included in the access point. If the network is in a state of security alert, security authority 402 may deputize certain devices on the network to perform functions such as data monitoring, information logging, etc. Details of the operations of the security authority and the networked devices/agents are discussed below.

Figure 5:
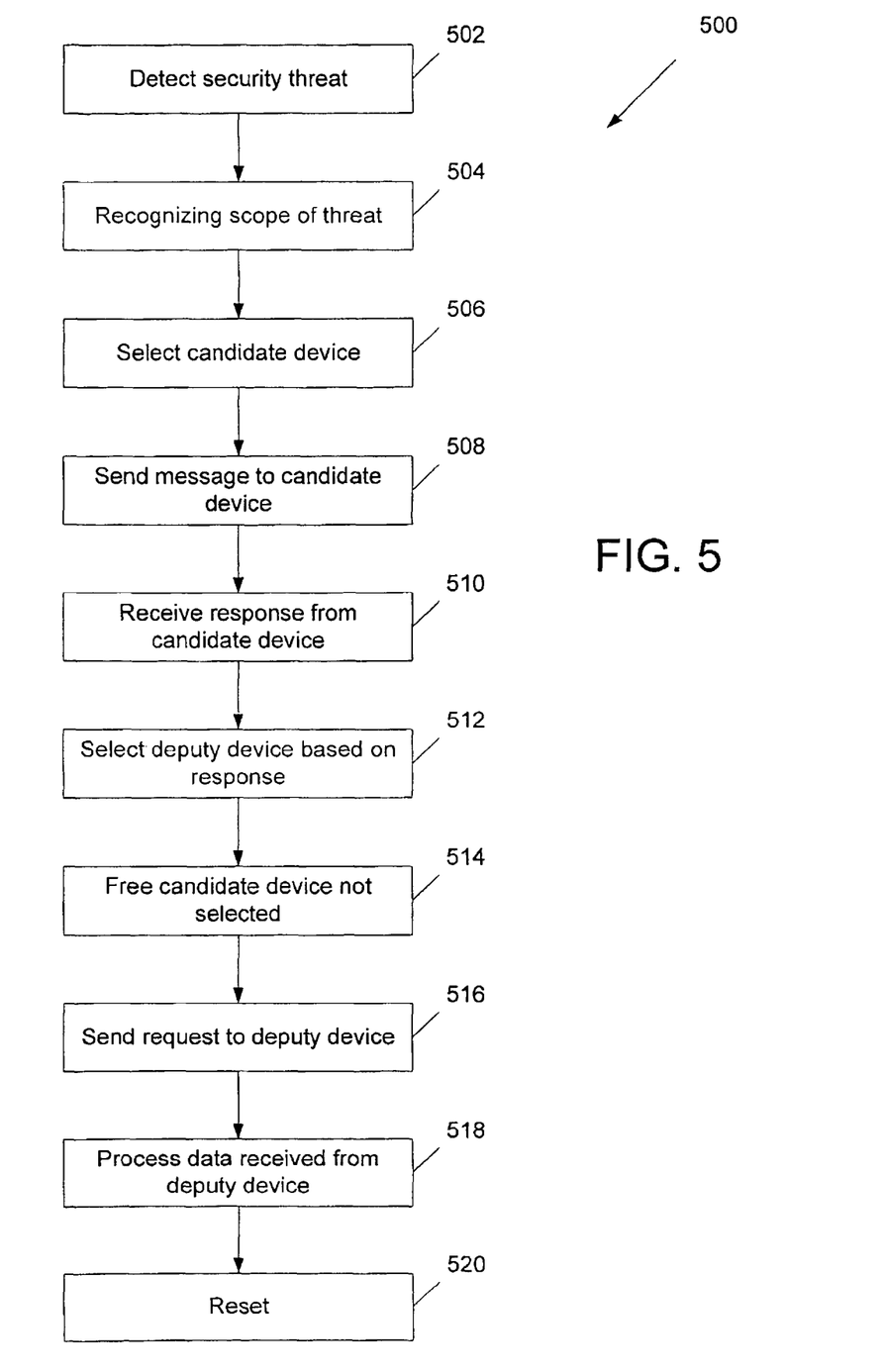
FIG. 5 is a flowchart illustrating another deputizing process of the security authority according to some embodiments.

FIG. 5 is a flowchart illustrating another deputizing process of the security authority according to some embodiments. In this example, process 500 initiates when a security alert has been detected (502). The scope of the threat is then determined (504). In some embodiments, suspicious devices involved in the security alert are identified. In some embodiments, the extent of the network that may be affected by the threat is recognized. One or more candidate devices are then selected (506). The candidate devices may be selected based on network topology. In some embodiments, the candidate devices include devices on the same subnet where the security threat is detected. In some embodiments, if a security threat is detected on a device that communicates with an access point (e.g. a wireless base station), the candidate devices then include devices that communicate with the same access point. The suspicious devices may be placed under watch and sometimes not included in the set of candidate devices.

An initial message is sent to the candidate devices (508). In some embodiments, the message is sent via a broadcast protocol. The message includes authentication information such as a digital signature for the security authority, which is used by the candidate devices to verify the identity of the security authority and determine whether to accept requests from the security authority. In some embodiments, the message includes information about the suspicious activity or device that triggered the alert, such as an internet protocol (IP) address, a MAC address, a certain data or behavior pattern, etc. The candidate devices are requested to observe certain activities or events and send responses to the security authority.

Responses are then received from the candidate devices (510). In some embodiments, the candidate devices observe traffic or activities for a predetermined amount of time and send responses based on the observations. The responses are useful for determining which ones of the candidate devices are suitable to perform the deputized security functions. Based on the responses, one or more deputy devices are selected from the candidate devices (512). Candidate devices that are not selected are freed (514). In some embodiments, the response from a particular candidate device may indicate the relationship between the candidate device and a suspicious device that is under watch. For example, if the designated device is located sufficiently far from a candidate device such that the candidate device cannot detect the activities or presence of the designated device, the candidate device is deemed unsuitable for carrying out the deputizing request and is not selected as a deputy device. In some embodiments, the responses from devices that are closely located are examined and correlated to ensure that the data received is consistent. Devices may be classified into different groups, for example an uninvolved group that cannot detect the activities of the designated device, a monitoring group that can detect the activities of the designated device, and a suspicious group that gave inconsistent response and may have been potentially compromised.

A request is then sent to the deputy devices (516). Data received from the deputy devices is processed (518). The processing steps may depend on the implementation of the security authority as well as the context of the received data. The security authority may take further actions such as alerting the administrators, preventing the designated device from sending or receiving data, changing the security alert level, etc. When the threat is eventually determined to be over, a reset signal is sent to the deputy devices (520), indicating that the deputy devices can stop performing the deputized functions and resume their normal activities.

Figure 6:
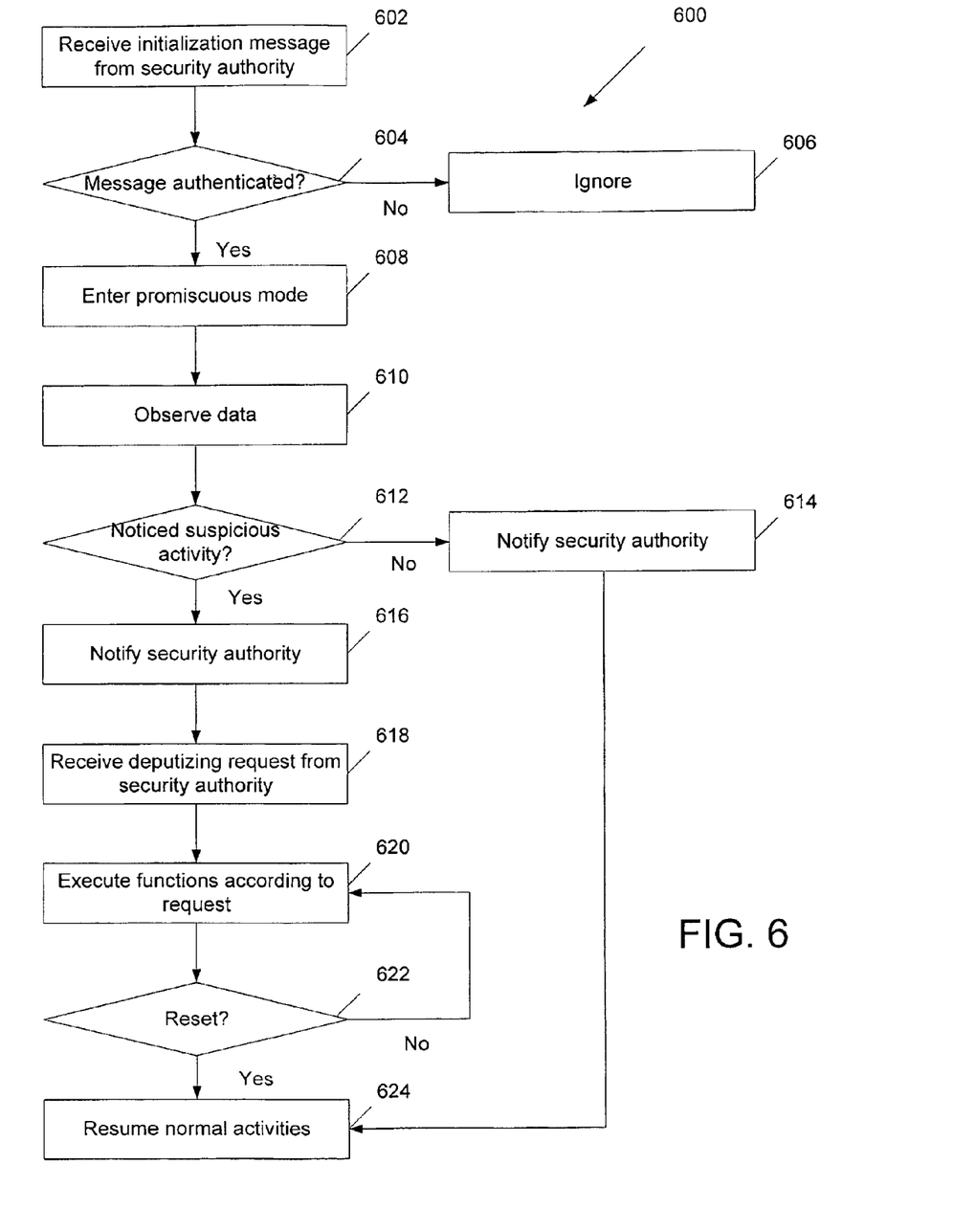
FIG. 6 is a flowchart illustrating the operations of another networked device embodiment.

FIG. 6 is a flowchart illustrating the operations of another networked device embodiment. In this example, process 600 starts when an initialization message is received from the security authority (602). The message is preferably authenticated (604). In some embodiments, a digital signature is included in the message for verifying the identity of the sender. If the message is not authenticated (for example, if the agent determines that the sender of the message is not the security authority), it is ignored (606). If the message is authenticated, the network interface of the device is put into promiscuous mode so that the interface receives more than data frames designated for the interface (608). Data transmitted on the network is then observed (610). In some embodiments, the initialization message sent by the security authority includes information about suspicious activities or devices that should be scrutinized. If no suspicious activity is observed after a predetermined amount of time, it is likely that a suspicious device is not nearby and therefore the networked device is not a good candidate for performing deputized functions (612). The security authority is then notified of this and the networked device is freed from its security duties and allowed to resume its normal activities (624). If, however, the observed data indicates suspicious activity (612), the security authority is then notified of the fact that the networked device is suitable for performing deputized functions (616).

At some point, the agent on the device receives a request sent by the authenticated security authority to eligible agents (618). Deputized functions normally not performed by the device are then carried out according to the request (620). The agent periodically checks to determine whether a reset signal has been received (622). If no reset signal has been received, the agent and/or the networked device continue to execute deputized functions. If a reset signal has been received, execution of deputized functions is stopped and normal activities are resumed (624).

The operations of the security authority and the agent shown in FIGS. 5 and 6 can be illustrated using an example based on the network shown in FIG. 4. For example, device 414, which has established a communication channel via access point 400, is suspected to have been compromised. Device 414 is then placed under watch by security authority 402. Security authority 402 selects devices 406-412, which also communicate with access point 400, as candidate devices. An initial message is sent to the candidate devices. In this example, the candidate devices are asked to observed data packets originating from the address (any network address can be used as appropriate, for example, IP address or MAC address) of device 414. The responses received from the candidate devices indicate that devices 406-410 have observed packets originating from device 414 while device 412 has not observed such packets. Based on the responses, devices 406-410 are selected as deputy devices and device 412 is allowed to return to its normal operations. The deputy devices may be asked to monitor traffic and activity of device 414. In some embodiments, the deputy devices are requested to take actions such as providing location information about device 414, preventing device 414 from communicating with the rest of the network by sending jamming signals to device 414, checking hardware information such as media access control (MAC) address, chipset information, etc.

The deputy devices gather information requested and send responses to security authority 402. The security authority may use the information to take further actions against designated device 414, such as blocking data transfer to or from the designated device. In some embodiments, the responses from several deputy devices are compared to determine if there is conflicting information. If there is conflicting information, the security authority may draw certain conclusions take further actions. For example, the security authority may determine based on the conflicting information that one or more of the deputy devices may have been compromised and should be scrutinized more closely. The status of such a device may be changed from a deputy device to a designated device. At some point, the security authority or a system administrator may determine that the threat is over. A reset signal is then sent to all deputy devices to allow them to resume their normal functions.

A technique for enhancing security capabilities of a network has been disclosed. The technique is applicable to networks that include wired devices, wireless devices or both. Deputizing security functions to devices enhances the security capabilities of the network during times of tightened security, and allows the devices to efficiently use available resources to carry out their primary duties under normal operating conditions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of enhancing security capability of a network, comprising:
   detecting a security threat associated with an affected device on the network;
   selecting a plurality of candidate devices, other than the affected device, based on network topology;
   sending to the plurality of candidate devices other than the affected device an initial request to collect and report data associated with the affected device, the initial request including authentication information used by the plurality of candidate devices to verify the identity of a sender, wherein the plurality of candidate devices do not ordinarily collect and report data associated with the affected device during normal state of operation;
   receiving from each of the plurality of candidate devices an initial report of data collected by the candidate device in response to the initial request;
   using the respective initial reports to select, from among the plurality of candidate devices, based on one or more selection criteria, a deputy device to be deputized to perform a deputized function that is not ordinarily performed by the deputy device with respect to the affected device;
   sending to the deputy device a request to perform, with respect to the affected device, a deputized function that is not ordinarily performed by the deputy device;
   receiving response data from the deputy device;
   processing the response data; and
   freeing the deputy device from performing the deputized function;
   wherein the deputy device performs the deputized function at least in part by configuring a network communication interface on the deputy device to receive a network communication not designated for said network communication interface, the deputized function including at least one of: generating log information and disabling a service.

2. The method of claim 1, wherein the deputized function includes monitoring data not ordinarily monitored by the deputy device.

3. The method of claim 1, wherein the deputized function includes monitoring network data not ordinarily monitored by the deputy device.

4. The method of claim 1, wherein the deputized function includes monitoring data not ordinarily monitored by the deputy device and sending monitored data to a security authority.

5. The method of claim 1, wherein the request includes performing a security task.

6. The method of claim 1, wherein the request includes scanning for virus.

7. A system for enhancing security capability of a network, comprising:
- a processor; and
- a memory coupled to the processor, configured to provide the processor with instructions to:
  - detect a security threat associated with an affected device on the network;
  - select a plurality of candidate devices, other than the affected device, based on network topology;
  - send to the plurality of candidate devices other than the affected device an initial request to collect and report data associated with the affected device, the initial request including authentication information used by the plurality of candidate devices to verify the identity of a sender, wherein the plurality of candidate devices do not ordinarily collect and report data associated with the affected device during normal state of operation;
  - receive from each of the plurality of candidate devices an initial report of data collected by the candidate device in response to the initial request;
  - use the respective initial reports to select from among the plurality of candidate devices, based on one or more selection criteria, a deputy device to be deputized to perform a deputized function that is not ordinarily performed by the deputy device with respect to the affected device;
  - send to the deputy device a request to perform, with respect to the affected device, a deputized function that is not ordinarily performed by the deputy device;
  - receive response data from the deputy device;
  - process the response data; and
  - free the deputy device from performing the deputized function;
- wherein the deputy device performs the deputized function at least in part by configuring a network communication interface on the deputy device to receive a network communication not designated for the network communication interface, the deputized function including at least one of: generating log information and disabling a service.

8. A non-transitory computer readable storage medium having embodied thereon computer instructions which when executed by a computer cause the computer to perform a method comprising:
- detecting a security threat associated with an affected device on the network;
- selecting a plurality of candidate devices, other than the affected device, based on network topology;
- sending to the plurality of candidate devices other than the affected device an initial request to collect and report data associated with the affected device, the initial request including authentication information used by the plurality of candidate devices to verify the identity of a sender, wherein the plurality of candidate devices do not ordinarily collect and report data associated with the affected device during normal state of operation;
- receiving from each of the plurality of candidate devices an initial report of data collected by the candidate device in response to the initial request;
- using the respective initial reports to select from among the plurality of candidate devices, based on one or more selection criteria, a deputy device to be deputized to perform a deputized function that is not ordinarily performed by the deputy device with respect to the affected device;
- sending to the deputy device a request to perform, with respect to the affected device, a deputized function that is not ordinarily performed by the deputy device;
- receiving response data from the deputy device;
- processing the response data, wherein the deputy device performs the deputized function at least in part by configuring a network communication interface on the deputy device to receive a network communication not designated for the network communication interface, the deputized function including at least one of: generating log information and disabling a service; and
- freeing the deputy device from performing the deputized function.

* * * * *